Patented Jan. 9, 1934

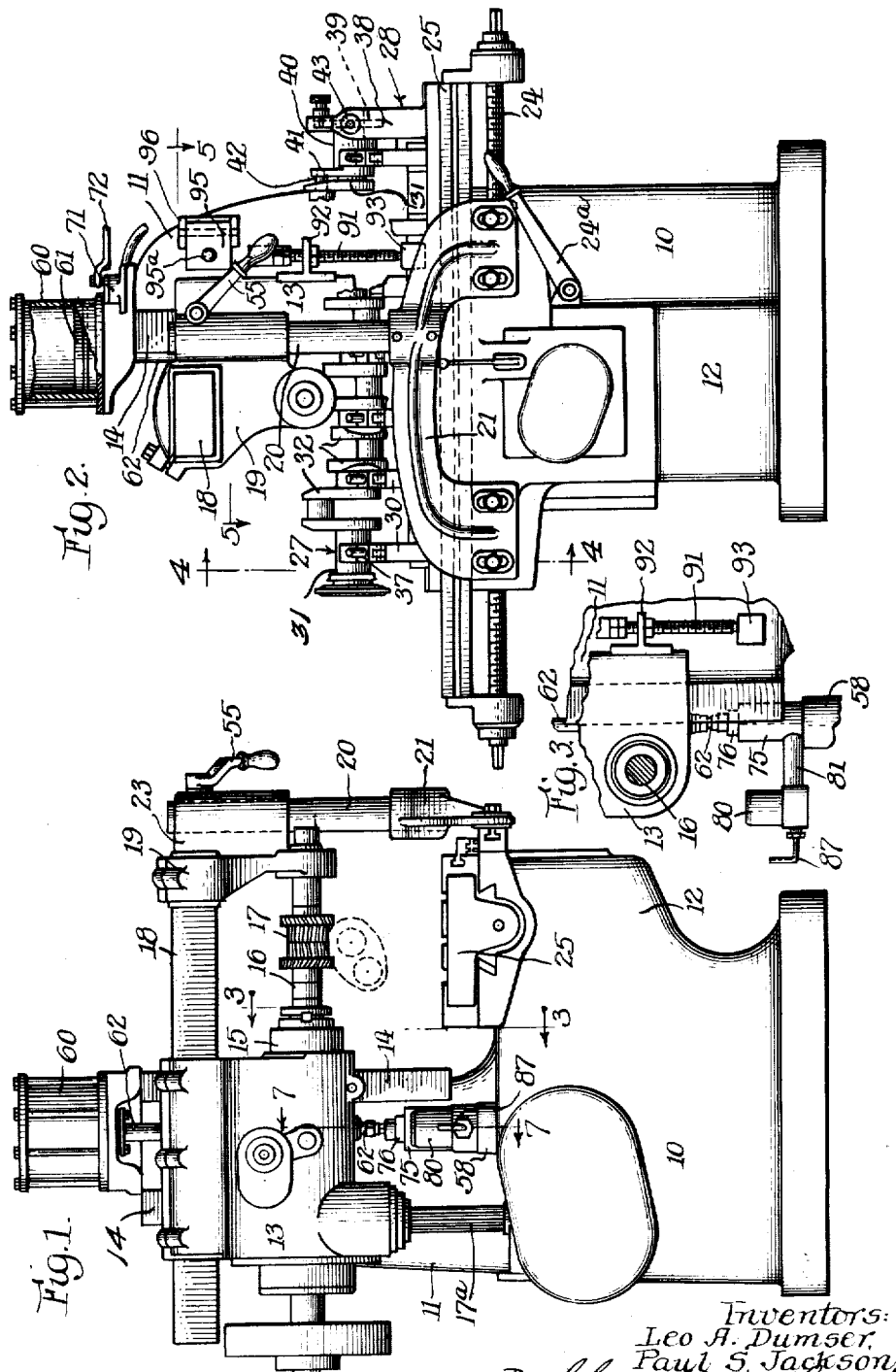

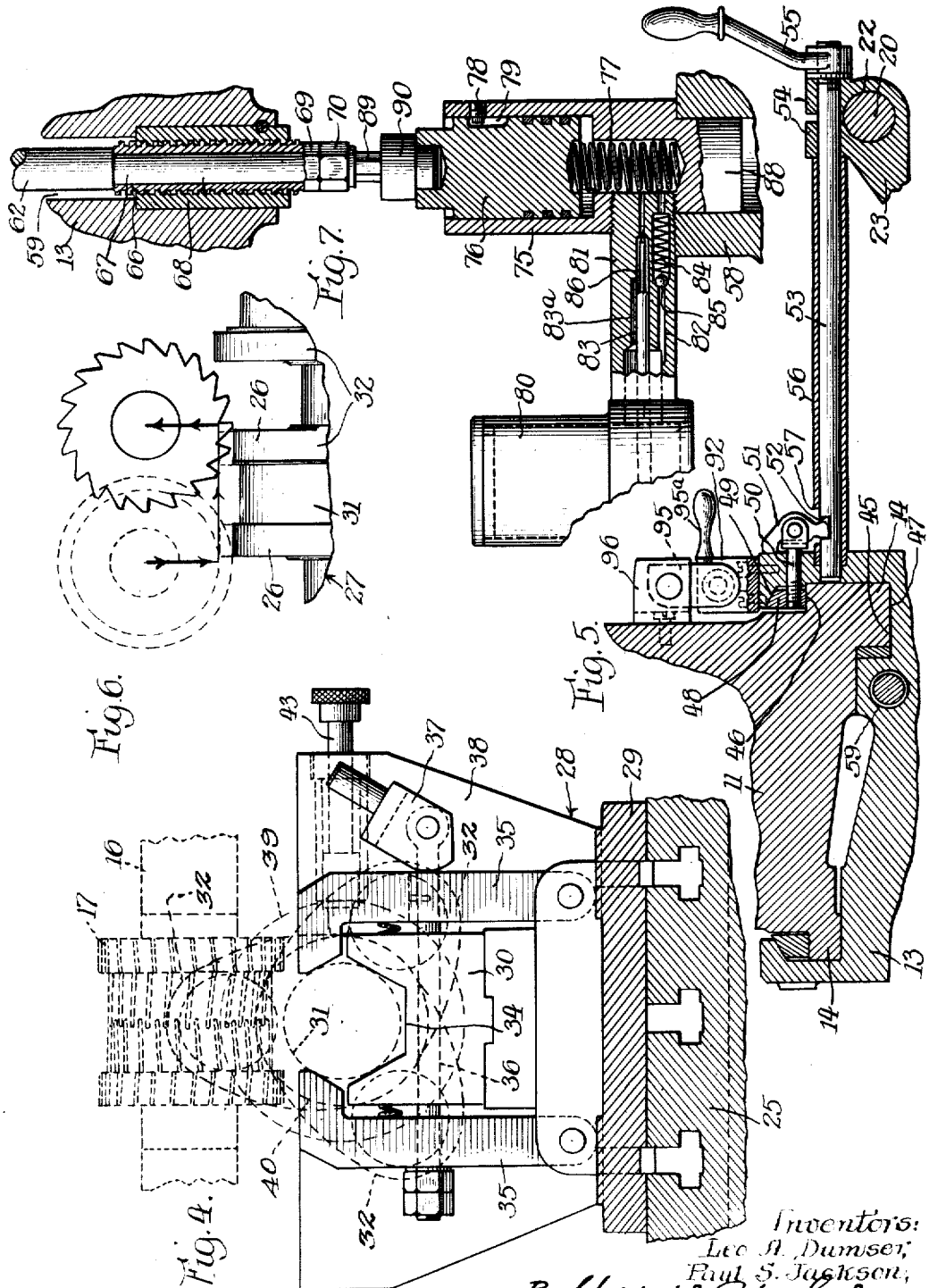

1,942,414

UNITED STATES PATENT OFFICE 1,942,414

ACTUATING MEANS FOR MACHINE TOOLS

Leo A. Dumser and Paul S. Jackson, Rockford, Ill., assignors to Sundstrand Machine Tool Co., Rockford, Ill., a corporation of Illinois Application February 13, 1929. Serial No. 339,618

6 Claims. (Cl. 90—15)

The invention relates generally to machine tools and more particularly to actuating means operated by means of pressure fluid for moving the tool or work supports of a machine tool.

Many of the industries using machine tools for the high speed production of duplicate parts are of a highly seasonal character wherein the entire design of the product is changed at frequent intervals to incorporate newly developed improvements. This has necessitated the rebuilding or replacing of many of the special purpose or production type machine tools usually used and the cost of such changes of equipment has proven to be an excessive burden upon such industries.

In accordance with the policy recently adopted by many companies, it is now the practice to anticipate the frequent necessity of changing the special purpose machines and to consider the new machines purchased with a view to their subsequent rebuilding or reorganization to meet the changes which may be made in the design of the product. In adapting such machine tools for the production of a different work piece, many of the changes necessary are made to provide a different cycle of operations and usually changes must be made in the actuating mechanism of one or more of the work or tool supports.

The primary object of the present invention is to provide a new and improved power operated mechanism for actuating the tool or work supports of a machine tool which mechanism is simple and economical in design and operation and is adapted to be readily incorporated in a machine tool of standard design without material alteration of any part of the machine so as to replace or supplement the standard actuating mechanism of the machine.

Another object is to provide a novel actuating mechanism for machine tools operable to impart accurately controlled movement to a support and to provide an advantageous and easily attained cycle of movements of the support, said mechanism being constructed so as to permit it to be mounted on the exterior of the frame of a commercial type of machine.

Another object is to provide a milling machine adapted for frequent raising and lowering of the cutter and embodying a vertically slidable head carrying an overarm for supporting the cutter, power means for raising and lowering the head, an outboard overarm support comprising a rigid vertical slideway, and clamping means for securing the head to the column and the overarm to the slideway, both of the clamping means being operable by a single handle at the forward side of the machine.

Another object is to provide a machine tool having a movable support, pressure fluid operated mechanism for rapidly reciprocating said support, and speed governing means effective during a predetermined portion of the advancing movement of the support to limit its speed to a definite rate suitable for the performance of a cutting operation or the like.

Another object is to provide a machine tool having a fluid pressure operated piston and cylinder device with means operable to govern the speed of the movable member of said device during a part of its movement, and a movable support mounted on the machine frame and actuated by said device, said support having an adjustable connection with the actuating device so that the controlled movement of the device may be made effective upon the support at different points along the path of the support without the necessity of changing the adjustment or position of the speed control means.

Another object is to provide a machine tool having a reciprocable support with pressure fluid operated means for rapidly moving the support together with speed governing means for the support arranged to permit a rapid retractive movement of the support or a rapid approach movement thereof to a predetermined point followed instantaneously by a feeding movement in the same direction at a definitely determined reduced speed.

The present embodiment of the invention consists of a machine tool having a support movable toward and away from a predetermined operative position, pressure fluid operated means for reciprocating said support, hydraulic means to control the speed of movement of the support as it approaches its operative position, and a pair of stop devices to limit the movement of said support, the first one of said devices serving to limit the advancing movement of said support while the second device is positionable in the path of the support to limit its retractive movement to an amount sufficient to permit movement of the work piece relatively to the cutting tool, the second stop device being readily movable from its operative position to permit the pressure fluid means to retract the support to a greater extent so as to facilitate the unloading and replacement of the work piece.

In the accompanying drawings:

Figure 1 is a side elevational view of a milling machine embodying the preferred form of the invention showing diagrammatically one arm of a crank shaft positioned adjacent the cutter for a milling operation.

Fig. 2 is a front elevational view of the machine shown in Fig. 1 with a work piece in position on the work table and having a part of the work piece broken away to show the stop means rearwardly thereof.

Fig. 3 is a fragmental front elevational view of the machine as viewed from the line 3—3 of Fig. 1.

Fig. 4 is a fragmental sectional view of the work table and work holder taken along the line 4—4 of Fig. 2 looking in the direction of the arrows and showing a work piece and the cutter diagrammatically.

Fig. 5 is a fragmental plan section taken along the line 5—5 of Fig. 2.

Fig. 6 is a fragmental front elevational view of a work piece and the cutter.

Fig. 7 is a fragmental view partly in section along the line 7—7 of Fig. 1.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the scope and spirit of the invention as expressed in the appended claims.

For purposes of disclosure the invention in its preferred form is herein illustrated as embodied in a milling machine of a common type having a base 10 with an upstanding column 11 and an integrally formed knee 12 projecting from the base forwardly of the column. A movable tool support in the form of a head 13 is mounted on the side of the column 11 for vertical sliding movement along guides 14 formed on the face of the column and within the head 13 a spindle 15 is rotatably mounted so as to extend from front to rear of the machine. The spindle 15 is adapted to support and form a driving connection with one end of an arbor 16 which carries a milling cutter 17 and which is supported at its outer end by an overarm 18 adjustably mounted in the head 13 above and parallel to the spindle 16 so as to project outwardly over the knee. An outboard bearing support 19 which rotatably supports the arbor 16 is carried by the overarm adjacent the outer end thereof.

The outer end of the overarm 18 is preferably braced by supporting means extending upwardly from the knee 12 and in its preferred form the means comprises a vertical shaft 20 carried by a bracket 21 secured on the outer end of the knee 12. The shaft 20 extends upwardly from the bracket 21 parallel to the guides 14 and the upper end of the shaft extends through a bore 22 (Fig. 5) in a forwardly extending portion 23 on the bearing support 19. The tool support 13, the overarm 18, and the cutter 17 are thus movable up and down along the column 11 and brace 20.

A second movable support is provided for the work which comprises a table 25 mounted on the knee 12 for reciprocation transversely of the axis of the cutter 17 and transversely of the path of movement of the cutter support 13. The table 25 is actuated by mechanism of any preferred nature, which in this instance is located within the base 10 and is connected to the table 25 by means including a feed screw 24. The movement of the table may be controlled by a manual control handle 24ª. The cutter 17 is actuated by mechanism of a common type within the base 10 connected to the spindle by means including a splined vertical shaft 17ª extending from the base 10 into the head 13.

With the preferred form of the invention embodied in it, the milling machine illustrated herein is particularly adapted for the performance of a milling operation on the several counterbalancing pads 26 formed on a crank shaft 27 (Figs. 2, 4 and 6) of the type commonly used in multiple cylinder internal combustion engines. Such a milling operation is performed by making a series of longitudinally spaced angularly displaced cuts parallel to the major or longitudinal axis of the crank shaft which is, therefore, rotatably supported on the work table with its longitudinal axis parallel to the path of reciprocation of the table 25.

For this purpose, a work holder 28 (Figs. 2 and 4) is provided having a base 29 adapted to be removably secured upon the top of the work table 25 and having a plurality of standards 30 (Fig. 4) projecting upwardly therefrom at spaced points to receive and rotatably support the journals 31 intermediate the crank arms 32 of the crank shaft. To this end a V-shaped groove 34 is formed in the top of each standard 30 and a pair of swingable arms 35 are mounted beside each standard, one arm 35 being positioned on each side thereof so that the arms may be swung into position to engage the top of the journal 31 to maintain it in position on the standard. To hold the swingable arms 35 in position, a bolt 36 extends between the two arms 35 of each pair and an eccentric clamping device 37 is provided so that the swingable arms may be quickly drawn together and clamped in position.

The crank arms 32 of the work piece 27 are, of course, angularly displaced from each other about the longitudinal axis of the work piece and to properly position the work piece an indexing mechanism is provided mounted in a standard 38 on the work holder 28 and having an indexing disk 39 therein carried by a tubular horizontal shaft 40 rotatably mounted in the support 38 so as to be coaxial with and receive the end journal 31 of a work piece supported in the holder. An arm 41 projecting radially from the shaft 40 carries a pin 42 adapted to engage a suitable indexing hole formed in the end crank arm of the work piece. An indexing pin 43 is mounted in the support 38 and is engageable with the disk 39 at a plurality of angularly spaced points to fix the work piece in position for the performance of a cutting operation thereon.

Because of the close longitudinal relation of the counter-balancing pads 26 of adjacent crank arms 32, it is necessary to retract the cutter after each longitudinal cut in order that the work piece may be angularly displaced for the next cutting operation.

In the normal milling operation on a crank shaft such as that shown in the drawings, the longitudinal cutting operations are performed by moving the table and the work beneath the cutter from right to left as shown in Fig. 2. Thus as illustrated in Fig. 6, the crank shaft is positioned in proper angular and longitudinal position relatively to the cutter and the cutter is moved downwardly until it cuts in to depth in the work piece. The table is then moved to the left under control of the handle 24ª until the cutting operation upon the two adjacent pads 26 has been completed and the cutter is then retracted to permit angular displacement of the crank shaft for the performance of the other cutting operations.

During the actual cutting operation the head 13 and the overarm 18 are preferably clamped to the column 11 and the brace or shaft 20 respectively and to facilitate clamping and unclamping when the head is to be moved vertically, clamping means is provided which is operable by a single conveniently positioned handle to clamp both the head and the overarm in position. In the preferred form shown in Fig. 5, the forward way 14 on the column 11 is arranged to provide opposed vertical surfaces 45 and 46 parallel to the spindle 16 and to each other, one of the surfaces being engaged directly by a surface 47 on the head and the other being engaged by a horizontally movable gib 48 engaging an angular opposed surface 49 formed on the head 13. The gib 48 is preferably arranged to clamp against the surface 46 when it is moved forwardly of the machine and a stud 50 is fixed in the gib and extends forwardly through the head for applying a clamping force to the gib 48. The stud 50 is pivotally connected to the middle of a lever 51 which bears at one end against the head 13 and at its other end engages a notch 52 formed in a horizontally positioned rod 53.

The rod 53 is slidably mounted at one end in the head 13 and extends forwardly through a pair of spaced clamping lugs 54 which when pressed together serve to clamp the projecting portion 23 of the overarm support 19 tightly on the shaft 20.

A handle 55 is screw threaded on the forward end of the rod 53 in abutment with the forward lug 54 so that by rotation of the handle, the rod 53 may be drawn forwardly to tighten the gib 48. During this clamping the forward lug 54 will be moved toward the other lug 54 to clamp the overarm 18 to the shaft 20 and to offset the rotative tendency of this clamping action, a strut or spacing sleeve 56 is provided surrounding the rod 53 with its opposite ends abutting the forward side of the head 13 and the rear lug 54, an aperture 57 being provided in the sleeve 53 through which the lever 51 may extend.

Standard milling machines of the type illustrated herein generally embody a vertically disposed screw shaft mounted rotatably in a cylindrical boss 58 (Fig. 1) on the base and extending into engagement with a suitable fixed nut secured in a vertical opening or bore 59 (Fig. 7) in the head 13, and by rotating the screw shaft by means of suitable manually operable actuating mechanism the head 13 may be vertically adjusted. The present invention however contemplates a machine adapted for work requiring vertical reciprocation of the tool support at least once during the production of each work piece and in order to provide a machine capable of economically producing duplicate work pieces of this character power means is provided for rapidly and conveniently imparting the necessary vertical movement to the tool support 13.

This power means is preferably of such a character that it may readily be incorporated into a standard machine without material alteration of any part of the machine and in the form herein illustrated comprises a device having a cylinder 60 with a piston 61 mounted therein and adapted for operation by pressure fluid such as compressed air which is readily available in most manufacturing plants.

The cylinder 60 preferably serves as the fixed member of the device and is removably secured on the top of the column 11 in such a position that a piston rod 62 (Fig. 7) secured to the piston 61 may extend downwardly into the head 13 through the opening 59 and be secured to the head so that the head 13 may be actuated by the device. Thus in the form illustrated, an exteriorly threaded sleeve 66 (Fig. 7) is rotatably mounted on a reduced portion 67 of the piston rod 62 and is arranged to engage a nut 68 secured in the head 13. The sleeve 66 has a head 69 formed on the lower end thereof to facilitate turning of the sleeve so as to make it possible to adjust the position of the head 13 relatively to the piston rod 62. A nut 70 on the end of the piston rod 62 serves to hold the sleeve 66 in position thereon and this nut may be clamped to prevent rotation of the sleeve on the rod. Thus the piston rod 62 is attached to the head 13 without alteration of any standard or permanent part thereof.

The piston and cylinder device is preferably of the double-acting type and a two-way valve device 71 (Fig. 2) having a control lever 72 is preferably formed integrally with the cylinder head so that pressure fluid supplied to the valve by suitable means (not shown) may be utilized to move the head 13 and the cutter carried thereby in either direction between a retracted inoperative position remote from the work piece and an operative position adjacent the work piece.

In the practical operation of the machine it is desirable that the operator be able to cause movement of the cutter 17 from one of these positions to the other by a simple rapidly accomplished movement of a single lever. The valve control lever 72 may, of course, be moved rapidly from one position to the other and when so moved, the cylinder and piston device causes a rapid or traverse movement of the cutter from one of its positions to the other. Such rapid movement is desirable except when a cutting operation is to be performed.

In the production of some classes of work, such as that shown herein, it is necessary to perform a cutting operation as the cutter approaches its operative position or is fed to depth, and means is therefore provided for governing the speed of movement of the support during a part of its approach movement by its actuating means. The pressure fluid operated piston and cylinder device serves to move the work support at an exceptionally rapid traverse rate in either direction so that rapid approach and rapid retractive movements of the support may be caused thereby and the provision of a governing means serves to limit the speed of a part of the advancing movement to a feed rate suitable for a cutting operation. In the form herein illustrated this means consists of a compactly arranged hydraulic feed governing device adapted for mounting exteriorly of the machine frame so as to cooperate with the head 13 or a part attached thereto in such a manner as effectively to limit the speed of the head during a predetermined feed portion of its advancing movement.

Preferably the feed governing device is constructed, assembled and mounted on the machine frame independently of the actuating mechanism so as to be adapted for rebuilding or reorganization of standard machine tools and in the present instance it comprises a cylinder 75 (Fig. 7) having an open upper end with a plunger 76 mounted in the cylinder and normally projected outwardly of the open end thereof by resilient means such as an expansive coil spring 77 mounted between the bottom of the cylinder 75 and the plunger 76. The plunger 76 is retained in the cylinder by means of a screw 78 extending through the wall of the cylinder and into a longitudinal groove 79 in the plunger 76.

A closed reservoir 80 adapted to contain oil or other fluid is connected to the cylinder 75 by a laterally extending member 81 through which two bores 82 and 83 are formed to provide independent connecting passages between the reservoir 80 and the cylinder 75. An enlarged portion 84 of the bore 82 serves to contain a spring pressed ball check valve 85 arranged to prevent passage of fluid through that bore from the cylinder, and a needle valve 86 in an enlarged portion of the bore 83 and operable by a handle 87 controls the rate of flow through that bore. A by-pass 83ª is provided in the bore 83 to permit free passage for the liquid from the valve orifice to the reservoir.

The reservoir 80 is adapted to contain fluid maintained under pressure by suitable means not shown herein so that the fluid, preferably oil, will normally tend to pass through the bore 82 past the check valve 85 to fill the cylinder 75 when the plunger 76 is pressed outwardly of the cylinder. When the plunger 76 is moved inwardly of the cylinder, the fluid beneath the plunger can not be forced out of the cylinder through the bore 82 because of the valve 85 and the speed at which the plunger 76 may be moved will therefore be determined by the pressure applied by the actuating device and the adjustment of the needle valve 86 which governs the size of the only available outlet.

As above pointed out, the feed control device is preferably mounted separately on the machine frame and is arranged to cooperate with the head 13 or a part closely associated therewith to control the speed of movement of the head during a feed portion of the approach movement thereof. In the present instance this speed control device is adapted for mounting on the cylindrical boss 58 which normally serves as a bearing for the usual head adjusting screw (not shown) and to this end a cylindrical projection 88 (Fig. 7) is formed on the bottom of the cylinder 75 coaxially therewith and adapted to project into the cylindrical boss 58 so as to permit the bottom of the cylinder to rest on the top of the boss. In this position the plunger 76 lies directly in the path of the projecting lower end of the piston rod 62, a projection 89 being secured in the bottom of the piston rod to strike a removable cap 90 positioned on the top of the plunger 76.

Thus when the piston 61 is actuated to move the head 13 rapidly toward its operative position, the end of the piston rod 62 will strike the cap 90 on the speed control device at a predetermined point in the movement of the head and the subsequent movment of the piston rod 62 and hence the head 13 and cutter 17 will be limited to a feeding rate so as to avoid undue strain on the cutter and the work piece.

The extent of the downward movement may of course be limited by the speed control device or by the stroke of the actuating piston, but in practice it is desirable to have the actuating and control devices of sufficient size to accommodate a considerable range of work and for this reason an independently adjustable stop in the form of a vertically mounted bolt 91 (Figs. 2 and 3) is secured in a bracket 92 on the head 13 in position to engage an abutment 93 formed on the frame.

The actuating piston and cylinder device is of sufficient stroke to move the head 13 and cutter 17 to an out-of-the-way position which permits the work piece or work holder to be readily removed and replaced. In order to permit the work piece to be rotated in setting it up for successive longitudinal cuts it is unnecessary to retract the head 13 to its remote or out-of-the-way position and means is therefore provided for limiting the retractive movement of the head 13. In the present instance this means comprises a stop 95 mounted on a bracket 96 on the column 11 for swinging movement by a handle 95ª about a vertical axis and arranged so that it may be readily moved into the path of the bolt 91 to limit the upward movement of the head.

By means of the threaded sleeve 66 the head 13 may be adjusted vertically along the piston rod 62 so that the controlled movement of the piston rod may be made initially effective upon the head while the head and cutter are at any desired distance from the work piece or work table.

In the operation of the machine illustrated the work piece is first loaded in the work holder while the cutter is in its retracted or inoperative position remote from the work table. By means of the indexing device on the holder the work piece may be positioned in the proper angular position for milling the pads on the end crank and after the work table has been traversed to the proper longitudinal position the valve-control handle 72 may be thrown to its other position to cause the actuating cylinder and piston device to move the head and cutter rapidly toward the work piece. When the cutter has nearly reached the work piece, the lower end of the piston rod will strike the plunger cap 90 of the speed control device and the subsequent movement of the cutter will be limited to a speed determined by the setting of the needle valve 86. During the movement of the cutter at the slow speed determined by the speed control device, the cutter may safely cut into the work piece the depth permitted by the adjustment of the adjustable stop 91 on the head.

When this depth of cut has been reached the cutter will be maintained in this relation to the work piece by the continued downward pressure of the actuating device. The head and overarm are then clamped in place by operating the handle 55, and the table feed of the machine is engaged to cause the work to be moved longitudinally of the cutter a sufficient distance to mill the two counter-balancing pads of the first crank. The cutter must then be withdrawn to permit the work piece to be angularly adjusted for the milling of the next two counter-balancing pads and since this retractive movement need only be sufficient to permit such rotative movement of the work piece, the swingable stop 95 on the column is moved to its effective position so as to prevent movement of the head to its completely retracted or inoperative position. The head and overarm are then unclamped and the head is raised by moving the valve handle 72 back to its first position.

After the work piece has again been indexed the operation may be repeated and so on until all of the pads have been milled. The swingable stop 95 is then moved to its ineffective position and the head is retracted by the actuating device to its remote position so that the finished work may easily be removed from the machine.

From the foregoing it will be apparent that the invention provides a new and improved feeding mechanism for the movable supports of a machine tool, which mechanism is simple and compact in form and may be readily incorporated in a standard machine to replace or supplement the standard feeding mechanism of the machine and it will also be evident that such incorporation of the applicants' feeding mechanism may be accomplished without materially altering any part of the standard machine.

Since the invention provides an easily and quickly operated means for holding the head and overarm clamped rigidly in place during the longitudinal cutting operation, it will be seen that great accuracy may be attained without materially reducing the rate of production.

We claim as our invention:—

1. A machine tool having, in combination, a frame, a support mounted on said frame, a cutter on said support, a work support mounted on the frame, one of said supports being movable toward and away from the other to bring the cutter into or move it out of operative relation with a work piece carried by said work support, pressure fluid operated means for moving said movable support in either direction, said means having a sufficient range to move said support to an out-of-the-way position remote from the other support to facilitate the removal and replacement of a work piece, an adjustable stop for limiting the movement of said movable support toward the other support, and a stop device movably mounted on said frame and adapted to be positioned in the path of said movable support to limit the retractive movement thereof to an intermediate position, said device being readily movable from its effective position to permit the support to be moved to its remote position.

2. A machine tool comprising, in combination, a frame, a support mounted on said frame for reciprocation to and away from an operative position, a compressed air operated cylinder and piston device mounted on said frame and connected to said support so that the support may be moved rapidly in either direction by operation of said device, said device having a sufficient stroke to move said support to an out-of-the-way position remote from said operative position, a stop adapted to be positioned in the path of said support to limit its movement away from said operative position, said stop being readily movable from its effective position to an intermediate position to permit said support to be moved to its remote position by said device, and hydraulic speed governing means mounted on said frame arranged to limit the speed of movement of the support as it approaches its operative position.

3. A milling machine comprising, in combination, a frame having a column, a work supporting table reciprocably mounted on said frame adjacent said column, a cutter support mounted for vertical reciprocation on said column, actuating means for reciprocating said support at a traverse rate comprising a pressure fluid actuated piston and cylinder device having its fixed member mounted on the top of said column, means for limiting the support movement to a feed rate during a portion of its stroke comprising a hydraulic feed governing device mounted on said frame beside said column and beneath said support and having an element engageable by said support, and a stop device movably mounted on said column and arranged in one position to engage an abutment on said support to limit the upward movement of the support to an intermediate position of the piston in the cylinder, and in another position to permit the support to move upwardly to the end of the piston stroke.

4. A milling machine having, in combination, a base, a column uprising therefrom, a table slidably mounted on said base, a head slidably mounted on said column for movement downwardly toward said table and upwardly away from the table, a spindle rotatably mounted on said head, a piston and cylinder device for reciprocating said head having a cylinder supported on the top of said column, adjustable means for determining the lowermost position of the head, and a stop device swingably mounted on said column and arranged in one position to engage an abutment on said head to limit the upward movement of the head to an intermediate position of the piston in the cylinder, and in another position to permit the head to move upwardly to the end of the piston stroke.

5. A milling machine having, in combination, a base, a column uprising therefrom, a table slidably mounted on said base in front of the column, a head slidable vertically on said column, a spindle rotatably mounted on a horizontal axis on said head, an overarm adjustably mounted on said head and extending forwardly therefrom over the spindle, bearing means on the forward end of said overarm for supporting a cutter arbor, means for supporting the forward end of said overarm comprising a bracket secured to the forward portion of said base, a cylindrical post carried on and extending upwardly from said bracket, a clamping member secured to the overarm and having a split portion surrounding said post, and means for clamping said head to said column and said member to said post comprising a clamping gib on said head arranged to engage a surface on the column, a device carried on said head for operating said gib, an operating rod extending forwardly through the split portion of the clamping member and connected at its rear end to said device, a handle threaded on the front end of said rod within easy reach of an operator in front of the machine and adapted when turned in one direction to draw the rod forwardly to clamp said gib against said column surface, and a sleeve surrounding said rod intermediate said head and said clamping member so that said handle simultaneously contracts said split clamping member onto said post.

6. A milling machine having, in combination, a base, a column uprising therefrom, a table slidably mounted on said base in front of the column, a head slidable vertically on said column, a spindle rotatably mounted on a horizontal axis on said head, an overarm adjustably mounted on said head and extending forwardly therefrom over the spindle, bearing means on the forward end of said overarm for supporting a cutter arbor, means for supporting the forward end of said overarm comprising a vertical post adjacent the forward portion of said base, means securing the lower end of said post to said base, a clamping member secured to the overarm and engageable with said post, and means for clamping said head to said column and said member to said post comprising clamping means on said head arranged to engage the column, a device carried on said head for operating said clamping means, an operating rod extending forwardly from the head connected at its rear end to said device, a handle threaded on the front end of said rod adapted when turned in one direction to draw the rod forwardly to clamp the head against the column, and means for securing said clamping member to said post operable simultaneously by said handle.

LEO A. DUMSER.
PAUL S. JACKSON.

CERTIFICATE OF CORRECTION.

Patent No. 1,942,414. January 9, 1934.

LEO A. DUMSER, ET AL.

It is hereby certified that error appears in the printed specification of the above numbered patent requiring correction as follows: Page 5, lines 44 and 45, claim 2, strike out the words "to an intermediate position" and insert the same in line 43 after the word "position" and before the comma; and that the said Letters Patent should be read with this correction therein that the same may conform to the record of the case in the Patent Office.

Signed and sealed this 15th day of May, A. D. 1934.

Bryan M. Battey (Seal) Acting Commissioner of Patents.